C. M. McCLAY.
ANTISLIPPING OVERSHOE FOR HORSES.
APPLICATION FILED FEB. 20, 1912.
1,031,281.
Patented July 2, 1912.
3 SHEETS—SHEET 1.
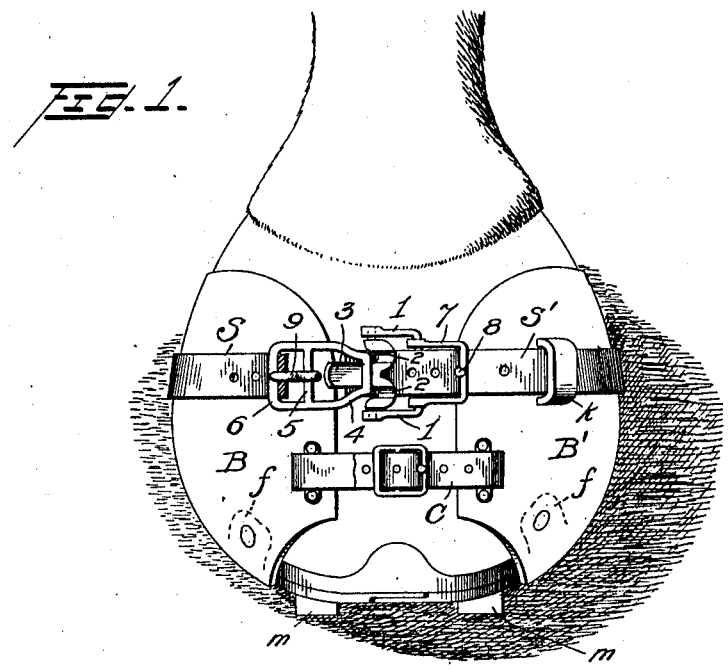
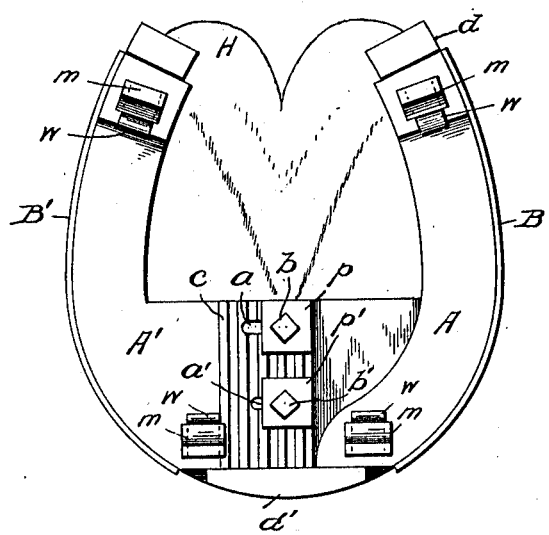
WITNESSES
INVENTOR
Charles M. McClay
by Edw. W. Byrn.
Attorney C. M. McCLAY.
ANTISLIPPING OVERSHOE FOR HORSES.
APPLICATION FILED FEB. 20, 1912.
1,031,281.
Patented July 2, 1912.
3 SHEETS—SHEET 2.
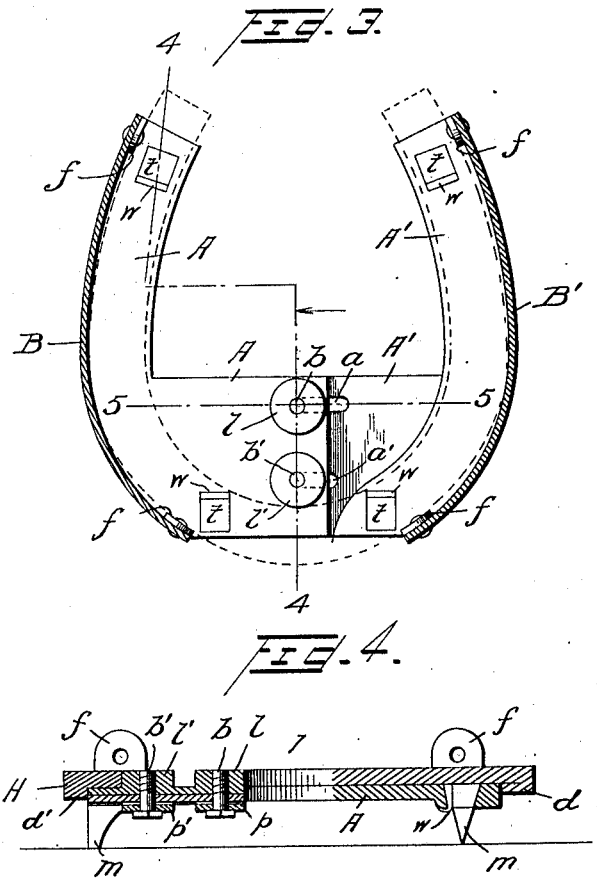
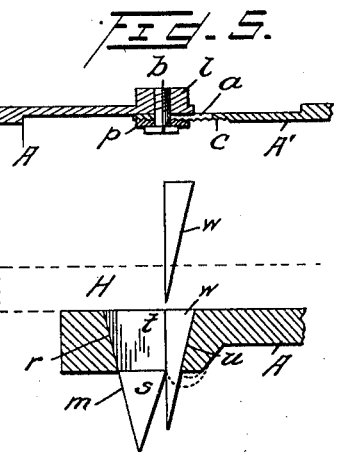
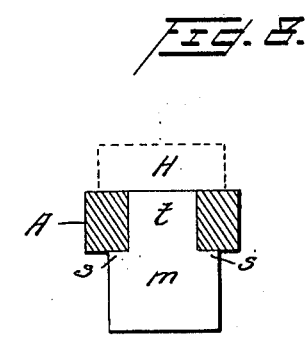
WITNESSES
INVENTOR
Charles M. McClay
by Edw. W. Byrn.
Attorney C. M. McCLAY.
ANTISLIPPING OVERSHOE FOR HORSES.
APPLICATION FILED FEB. 20, 1912.
1,031,281.
Patented July 2, 1912.
3 SHEETS—SHEET 3.
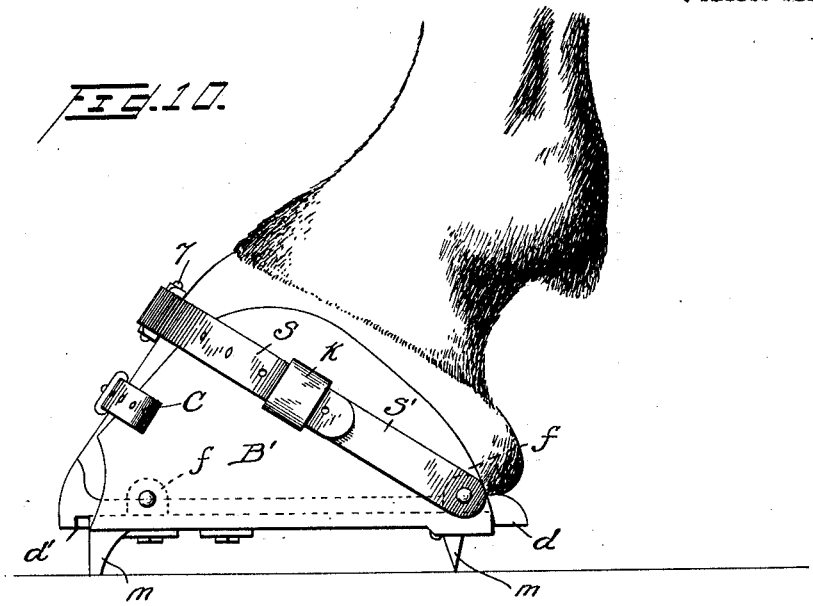
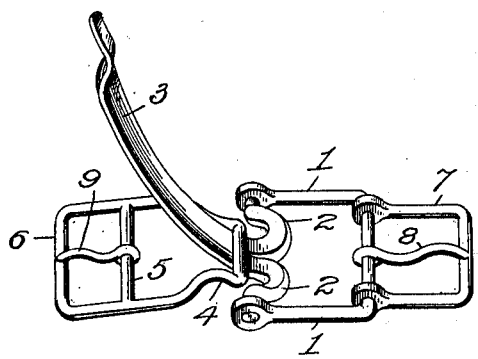
WITNESSES
INVENTOR
Charles M. McClay
by Edw. W. Byrn.
Attorney

UNITED STATES PATENT OFFICE.

CHARLES M. McCLAY, OF WASHINGTON, DISTRICT OF COLUMBIA.

ANTISLIPPING OVERSHOE FOR HORSES.

1,031,281.     Specification of Letters Patent.     Patented July 2, 1912.

Application filed February 20, 1912. Serial No. 678,864.

*To all whom it may concern:*

Be it known that I, CHARLES M. MCCLAY, a citizen of the United States, residing at Washington, in the District of Columbia, have invented certain new and useful Improvements in Antislipping Overshoes for Horses, of which the following is a specification.

My invention relates to overshoes for horses of the kind designed to be applied to the outside of the horse's shoe to prevent the animal from slipping on the ice or slippery road beds and which may be quickly and easily applied or removed by any one without the need for a blacksmith.

It is an improvement upon that form of overshoe which is provided on its under side with calks and which overshoe is made in two laterally adjustable sections adapted to be expanded or contracted to fit the different sizes and shapes of horses' hoofs and which are provided with means for attaching them to the horse's hoof.

My invention consists in the novel form and combination of the overshoe sections, in the novel construction and arrangement of detachable calks in said overshoe sections and in the novel construction and arrangement of devices for fastening the overshoe upon the hoof of the horse, as will be hereinafter fully described and pointed out in the claims.

Figure 1. is a front view of the overshoe on the horse's hoof. Fig. 2. is an underneath view. Fig. 3. is a top plan view of the overshoe with the position of the horse shoe indicated in dotted lines and the boot in horizontal section. Fig. 4 is a vertical longitudinal section on line 4—4 of Fig. 3, the horseshoe H being shown in full lines. Fig. 5. is a vertical transverse section on line 5—5 of Fig. 3. Fig. 6. is a top plan detail of the heel portion of an overshoe. Fig. 7. is a longitudinal sectional detail through line 7—7 of Fig. 6. showing the method of inserting and clenching the wedge which holds the calk. Fig. 8. is a cross section on line 8—8 of Fig. 6. Fig. 9. is a perspective view of the double adjustment clamping device and, Fig. 10. is a side elevation of the overshoe on the horse's hoof, in working position.

Similar letters of reference indicate the same parts in all the views.

In the drawing A $A^1$, Figs. 2 and 3, represent the two metal sole sections of the overshoe, which are made of steel, either drop-forged or cast. As shown, the front portions of these sole sections extend each a little more than half way across the middle line of the shoe and are lapped past each other. This lapped portion may extend only across the toe portion of the shoe, as shown, or it may extend as much farther to the rear as desired. The lapped joint of the two sole sections is adjustable to permit the overshoe to be laterally expanded or contracted to fit the varying sizes and shapes of horse's feet, and this joint is so constructed that the sole sections may be adjusted away from each other either in parallel lines, equally at front and rear, or the sections may be adjusted pivotally so that the adjustment of the rear portion may be greater or less than that of the front portion and may be also locked in any of the positions. For accomplishing this, see Figs. 2 and 5, the outer sole section $A^1$ is corrugated longitudinally at $c$, with parallel longitudinal serrations and is provided with two transverse slots $a$ and $a^1$, of which the rear one $a$ is somewhat the longer. Through these slots pass the two headed screw bolts $b$ and $b^1$, the heads being on the outer or lower side, and between the heads of these bolts and the corrugated outer surface of the sole section there are interposed locking plates $p$ $p^1$, Figs. 2, 4 and 5, which have each a hole to receive the bolt and the faces of which plates adjacent to the outer sole plate are corrugated with parallel serrations to correspond to and mesh with the serrations of the sole plate. Now if it be necessary to widen the overshoe equally at front and rear the two bolts are adjusted an equal distance in their slots, but if the rear of the overshoe is to be expanded more than the front, then the two sole sections are turned pivotally about the forward bolt $b^1$. If the horse's hoof has a very broad toe part then the sole sections are turned pivotally about the rear bolt $b$. In any position the corrugations of the locking plates $p$ $p^1$ follow the alinement of the corrugations $c$ on the sole section and lock the two sole sections firmly to such position, because each plate hugs closely the bolt, and locks into the corrugations of the outer sole section and the screw threaded upper ends of the bolts enter screw threaded holes of the upper sole section, which holes are formed in raised bosses or lugs $l$ $l^1$ cast or forged integrally on the upper face of the upper sole section.

At the outer peripheral edge of each metal sole section are formed two upwardly projecting flanges $f$ $f$, see Figs. 1, 3, 4 and 10. To these flanges on each side of the overshoe is riveted a leather boot flap B and $B^1$ each of which extends up over the side and front part of the horse's hoof and they are together provided with fastening devices of peculiar construction, designed to accomplish an important result, in connection with an overshoe having laterally adjustable sections. The fastening device, which I have provided, is shown in Figs. 1 and 9. In its main features, of quick locking, by a swinging cam lever, it is old and well known, but in applying it to an overshoe having laterally adjustable sections, provision must be made for a take-up on each end independent of the take-up of the locking lever, so that the position of the fastening device will always be maintained on the middle front line of the horse's hoof whether on a large or small hoof, instead of being off to one side where the horse would strike it with his other foot and either cut himself or loosen the clamping lever.

Referring to Fig. 9, the numeral 1 is a bail in whose ends are formed bearings that receive the crank ends 2, 2, of a locking cam lever 3. This locking cam lever 3 extends through a loop 4 so that when it is swung over to the right it draws the bail 1 and loop 4 together and locks past the dead center in a well known way. Outside of the bail 1, is another bail 7 whose ends are formed with bearings which embrace the cross bar of bail 1 and on which cross bar is hinged a tongue 8 forming a buckle end. At the other end of the fastening the loop 4 has a cross bar 5 with hinged tongue 9 and a bail forming a buckle 6 to this end of the fastening. This fastening, see Fig. 1, is detachably connected to straps S and $S^1$ of the boot flaps B $B^1$. The perforated end of strap $S^1$ fastens to the buckle 7 and then passes down underneath the crank ends 2, 2 of lever 3 where the strap end is retained and which strap end forms a cushion to keep the turning of lever 3 from injuring the hoof. At the other end of the fastening the strap S passes through the buckle 6 and after the lever is turned over to lie flat down upon the parts 1 and 7 the strap end S is brought over it and passed through keeper $k$ as seen in Fig. 10, where it protects the fastening. As shown in Fig. 1, the fastening device is relaxed and lever 3 is open and the end of strap S is cut off where it passes through the buckle 6 to avoid obscuring the parts which normally lie under it. With this device it will be seen that the fastening device has a double take-up adjustment by a buckle at each end, which allows the fastening to maintain a central middle position, no matter whether applied to a small hoof or large hoof, and also allows a quick fastening or unfastening of the overshoe upon the hoof by merely manipulating lever 3. This double take-up device, with quick clamping action, is correlated to an overshoe having laterally adjustable sole sections, in that it not only permits a wide range of application and a quick adjustment, but also always keeps, in all of its applications, the fastening device in the central or middle position on the hoof, where it is not struck by the other hoof of the horse in traveling which would have a tendency both to loosen the fastening and scar the other leg of the horse.

As an additional safeguard for holding the overshoe upon the hoof a second strap with buckle, C, is applied to the boot flaps lower down near the toe, but this may be dispensed with if desired. When the overshoe, and its boot flaps, are applied to the horse's hoof just below the permanent shoe on the horse, the shoe cannot rise out of the boot and it cannot go forward or sidewise by reason of the flanges $f$ $f$ of the boot and the heel calks $d$ of the shoe, (if there are any) while the backward movement of the shoe in the overshoe is resisted by the lug $l^1$ see Fig. 4, lying in the plane of the horseshoe H and bearing against the inner edge of the same at the toe. The toe calk $d$ on the horseshoe, if there be one, as shown in Figs. 2 and 4, also resists the backward movement of the shoe by extending down in front of the subjacent overshoe.

In order to enable the overshoe to be used indefinitely, the calks $m$ on the lower side of the same are made detachable as seen in Figs. 6, 7 and 8 and capable of being replaced by new ones when worn out. For this purpose the sole plate of the overshoe is made with a rectangular opening through it in which the tenon of a calk is retained by a dovetail bearing and a wedge, which features have been heretofore employed in horseshoes, but my special construction and arrangement has special reference to and coaction with an overshoe in which the calk is applied from the under side and the wedge is applied from the top side, which mode of applying the wedge is obviously impossible with a horse shoe already on a horse's hoof.

A is one of the metal sole sections of the overshoe through which is formed a rectangular opening of the same width as the tenon $t$ of the calk, which calk has below the tenon $t$ offsetting shoulders $s$ $s$ which lie against the under side of the sole section A and prevent the calk from moving upwardly after the tenon is inserted in the opening from the under side. Both front and rear sides of the opening in the sole section are inclined, flaring outwardly at the top. One side of the tenon has the same flare or incline as seen at $r$, Fig. 7, and the opposite side of said tenon is vertical or parallel to the longitudinal axis of the calk. This leaves a tapering space $u$ between this side of the tenon and the inclined wall of the sole section which space is largest at the top and is adapted to receive a wedge $w$ from the top. The greatest dimension of the tenon at the top is less than the corresponding width of the opening at the bottom of the sole section, so that the tenon $t$ can be inserted from the under side. After being so inserted, the tenon is moved laterally until its inclined side abuts the incline $r$ of the hole, leaving a wedge shaped space on the opposite side. Into this wedge shaped space is now inserted, from the top, the wedge $w$ and, after it is driven down, its lower chisel edge is bent over or clenched, as shown in dotted lines, in Fig. 7, which keeps it from rising and the top is cut off or hammered down so that the horseshoe may rest flat against it, as indicated in dotted lines at H. The calk is now firmly seated against all strains. It cannot rise on account of the shoulders $s$ $s$. It cannot come down on account of the bevel or incline $r$ and the key $w$ cannot move down on account of its taper and cannot rise on account of its clenched lower end. To take it out, however, all that is necessary is to straighten or cut off the lower clenched end of the wedge, drive it upward and out and then pull the calk down.

I claim.

1. An antislipping overshoe for horses, comprising two laterally adjustable metal sole sections having calks on their under side, means for locking them at varying adjustments, and fastening devices for the same extending across the top of the hoof, such fastening devices consisting of flexible members and a central fastening device having a take up connection at each end and a quick locking device in the middle.

2. An antislipping overshoe for horses, comprising two laterally adjustable metal sole sections having calks on the under side, means for locking them at varying adjustments, fastening devices for the same extending across the top of the hoof consisting of two boot flaps with straps and a central fastening device for the straps having a buckle at each end to connect with the straps and a swinging and quick acting locking lever in the middle.

3. An antislipping overshoe for horses, comprising two laterally adjustable metal sole sections and means for locking them, each sole section having calks on its lower side and having on its outer peripheral edge upwardly extending integral flanges, two flexible boot flaps riveted to the flanges on opposite sides and having straps extending over the horse's hoof and a fastening device for the two boot flap straps comprising a take-up buckle at each end for the two straps and a swinging clamp lever between them connecting the two buckles and tightening them after adjustment and preserving the central position of the fastening device.

4. An antislipping overshoe for horses, comprising two laterally adjustable metal sole sections, each having calks on its lower side and having on its outer peripheral edge upwardly extending integral flanges, said sole sections being arranged to lap past each other on the middle longitudinal line and one section having bolt holes and the other having slots arranged transversely to the overshoe and bolts arranged in said holes and slots, whereby the sections may have a pivotal adjustment about either bolt or a parallel lateral adjustment, flexible boot flaps with straps extending over the horse's hoof and a fastening device for the boot straps having a buckle at each end and a swinging clamping lever in the middle connecting the buckles.

5. An antislipping overshoe for horses, comprising two laterally adjustable metal sole sections, each having calks on its lower side and having on its outer peripheral edge upwardly extending integral flanges, flexible fastening devices connected to said flanges and passing over the horse's hoof, the metal overshoe sole sections having their forward ends lapping past each other in the middle and constructed—the outer one with parallel longitudinal corrugations and two transverse slots and the inner one with bolt holes, bolts passing through said slots and holes and locking plates interposed between the bolt heads and the corrugations of the outer sole sections and having corrugations fitting the corrugations of said sole section.

6. An antislipping overshoe for horses, comprising two laterally adjustable sole sections having lapped longitudinal edges in the middle line, the outer section being formed with parallel longitudinal corrugations and two transverse slots and the inner section having bolt holes with raised and screw threaded integral lugs on the upper side, perforated plates having parallel longitudinal corrugations on their upper sides, fitting the external corrugations of the outer sole section in both the lateral and pivotal adjustment of the same and screw bolts extending through said perforated plates slots and holes and lugs.

In testimony whereof I affix my signature in presence of two witnesses.

CHARLES M. McCLAY.

Witnesses:
 SOLON C. KEMON,
 J. MIDDLETON.

Copies of this patent may be obtained for five cents each, by addressing the "Commissioner of Patents, Washington, D. C."